Dec. 7, 1937.  G. C. MORGAN  2,101,151
LINTER GIN RIB MOUNTING
Filed July 6, 1936  2 Sheets—Sheet 1

George C. Morgan  INVENTOR

BY

ATTORNEY

Dec. 7, 1937.  G. C. MORGAN  2,101,151
LINTER GIN RIB MOUNTING
Filed July 6, 1936  2 Sheets-Sheet 2
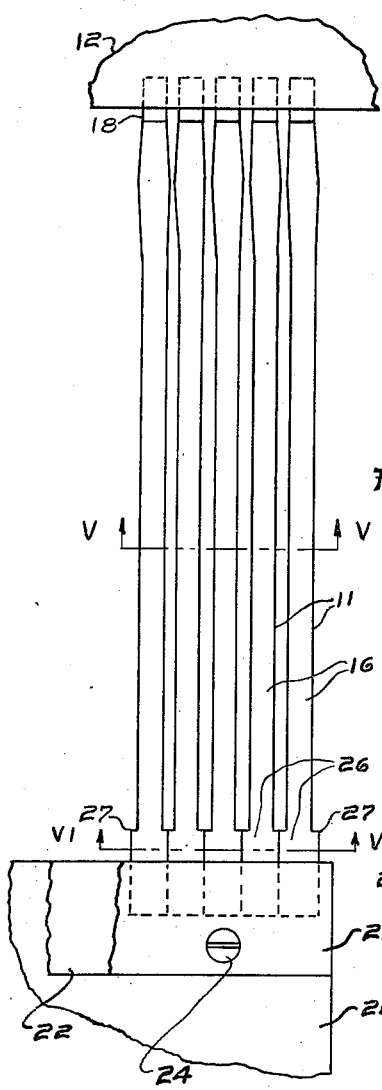
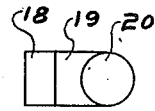
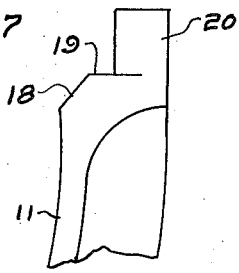
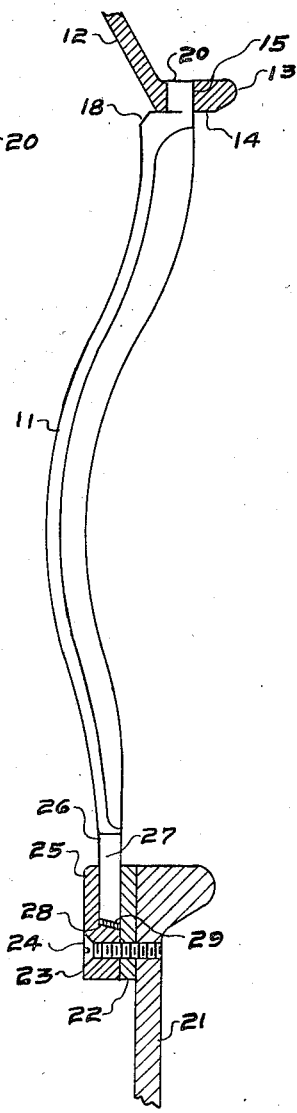
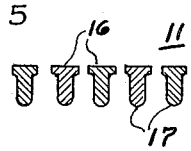
George C. Morgan  INVENTOR
BY
ATTORNEY Patented Dec. 7, 1937

2,101,151

UNITED STATES PATENT OFFICE 2,101,151

LINTER GIN RIB MOUNTING

George C. Morgan, Birmingham, Ala., assignor to Continental Gin Company, a corporation of Delaware Application July 6, 1936, Serial No. 88,950

5 Claims. (Cl. 19—62)

My invention relates to an improved mounting for gin ribs, which is particularly, but not exclusively, adapted for use in linter gins, and its object is to devise a simple, accurate and effective means for both centering and rigidly mounting the ribs against relative displacement in the grate fall or linter breast.

Linter gin ribs are set with very close clearances and to be efficient and practicable they must be capable of ready interchange and replacement with assurance that the new ribs will seat accurately on exact centers and will each hold its relative clearance on both sides with the adjacent ribs thereby to maintain the required saw clearances.

As the means for centering and mounting the upper ends of the ribs I form thereon a cylindrical stud and fit it with a snug fit into one of a series of accurately centered holes bored in an upper rib rail element. The rib end from which the stud projects is accurately finished to form a thrust bearing shoulder normal to the stud axis and flat to seat squarely against, and transmit thrust to, the flat bored face of the upper rib rail element.

My invention further contemplates that the upper rib rail, or at least that portion which is drilled and faced to receive the upper end of the ribs, shall be of metal and it may be formed by a steel shape either added to or constituting an existing element in linter gins.

My invention also contemplates an improvement in the manner of centering and fastening the lower ends of the ribs on the lower rib rail by providing them with accurately faced or ground side shoulders which abut and center them in exact correspondence with the centering of the holes in the upper rib rail. I further mount on the lower rib rail clamp bars shaped both to rigidly hold down the adjacent rib ends and also to force the ribs, by means of a yieldable wedging face, against their upper rib rail seats, whereby all ribs, even though lacking absolute uniformity in size, will yet be held rigidly in position, and transmit their thrust uniformly to said upper rib rail.

Another feature of advantage lies in the fact that the centering stud at the upper end of the rib is displaced downwardly away from its working face which leaves its faced end above the stud serving as a shoulder that is brought under compression against the upper rib rail during service condition by the action of the roll in the roll box whereby the direct working thrust is taken off of the centering stud and transferred to the upper rib rail and the chief functions of the studs are to center the ribs and bear the shear strain imposed on them.

A further distinctive feature lies in the provision of the rib clamp with a slightly bevelled end seat and a compressible face so that when being drawn to its working position the bevel will act both downward and endwise on the several ribs to insure their being forced firmly against the upper both rails.

My invention further comprises the novel details of construction and arrangements of parts, which in their preferred embodiment only are illustrated in the accompanying drawings, wherein I have shown my improved rib mounting in a conventional type of linter gin.

Fig. 2 is an elevation showing fragmentally an assemblage of ribs in the grate fall or breast of a gin, with the saws omitted.

Fig. 3 is a view in side elevation of Fig. 2.

Fig. 4 is an end elevation of the stud and faced seat at the upper end of the rib shown enlarged.

Figs. 5 and 6 are cross-sectional views taken along the lines V—V and VI—VI of Fig. 2.

Fig. 7 is a fragmental view in side elevation of Fig. 4.

Similar reference numerals refer to similar parts throughout the drawings.

Figure 1:
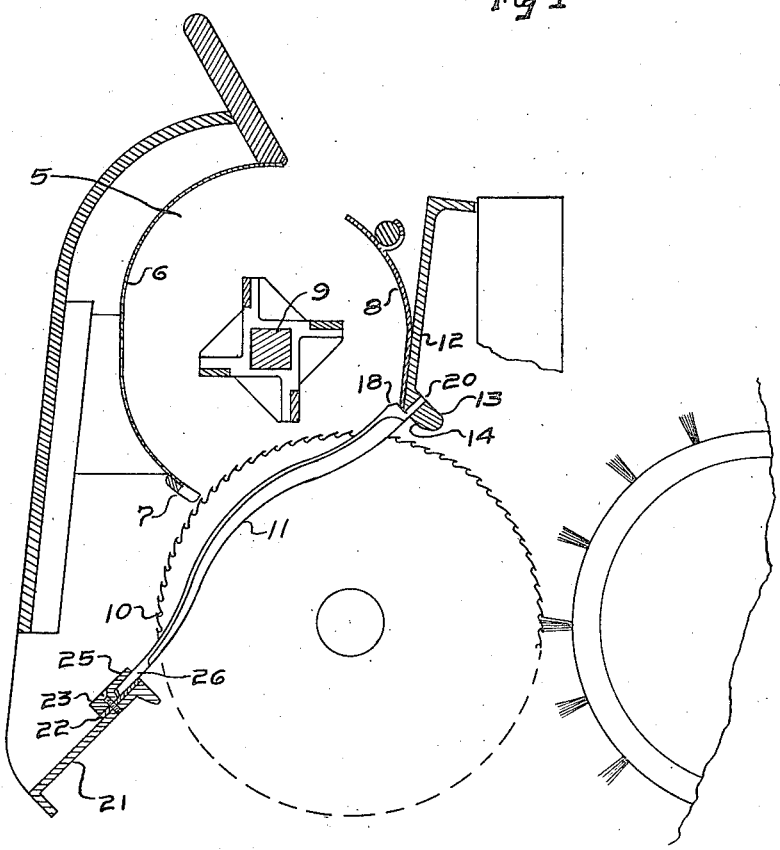
Fig. 1 shows a vertical cross-section through the upper portion of a linter gin with its ribs, shown in side elevation, mounted in accordance with my invention.

In the embodiment of my invention illustrated, 5 indicates the roll box of a linter gin, the breast structure of which comprises a front or outer concave board or liner 6, carrying at its lower end a toothed rack head 7, and a back or inner concave liner plate 8. A roll 9, rotatably driven, works in the roll box in the breast and saws 10 work between linter gin ribs 11 which are made fast at their upper ends in an upper rib rail element of any suitable construction, that shown being what is termed a bulb angle 12 having its lower flange 13 faced off accurately to provide a flat, smooth rib seat 14 through which I drill on accurate centers an aligning series of equidistant rib centering sockets or holes 15.

The ribs 11 may have any desired curvature and shape in cross section throughout their arcuate working portions, the type shown having a working face 16 and an under portion 17 which tapers downwardly to provide increasing clearances between adjacent ribs. The working faces 16, as will appear in Fig. 2, are slightly reduced in width near their upper ends to increase the clearance provided for the teeth on the interposed saws as they pass between the ribs bearing lint from the roll box. The upper end of each rib is formed with a bevelled face 18 and a faced end shoulder 19 from the under or back end of which projects a cylindrical centering stud or pin 20. As will appear in Fig. 3 this shoulder 19 is intended to seat flush against the upper rib seat 14, when its respective stud 20 is fully received in its centering hole 15, and to project forwardly beyond the seat 14 sufficiently to be engaged by the lower end of the concave liner plate 18.

The lower rib rail 21, formed as shown by a bulb angle, supports the lower end of the ribs, which ends may rest directly upon the rib rail that will then be faced or ground to receive them, but preferably they will rest upon a liner strip 22 of wood or other slightly compressible material secured along the upper edge of the rib rail 21 for the full length of the grate fall. A clamp plate 23, in one or more sections as desired, is mounted by screws 24 on the rib rail 21 over strip 22 and shaped to provide a hold-down clamp lip 25 which rests flush upon the top face of the lower rib ends 26, which ends are ground top and bottom to an accurate size so as to fit snugly and uniformly between the elements 22 and 25.

The rib ends 26 have laterally offset shoulders, indicated at 27 in Fig. 4, which are accurately ground or faced along their abutting edges to a size that will center the lower ends of the ribs in accurate conformity with the centering of their upper ends controlled by the interfit of their studs 20 in the holes 15 in the upper rib rail.

The clamp plate or plates 23 provide at the lower end of the hold-down lip 25 a slightly bevelled stop shoulder 28 which is faced with a compressible strip 29 of leather, wood or like material that will bear against the end edge of the rib ends 26, which, if desired, may be correspondingly bevelled. The ribs are all ground to produce uniformity in length between their shoulders 19 and their lower end edges.

By reference to Fig. 3, it will be seen that the mounting for the lower end of the ribs lies parallel, but substantially out of line, with the centering holes 15 for the studs 20. As a result of this, when the ribs are clamped in position in the seats provided for their upper and lower ends, they are prevented from turning or rocking laterally out of position and in fact, are held very rigidly in their correct operating position. By loosening and removing the lower clamp plate overhanging any rib that is to be replaced, the latter can be slipped out easily and a replacement rib inserted in its place.

Notwithstanding that the ribs are intended to be made and finished with great accuracy and uniformity, they will nevertheless in practice be found to differ slightly and my method of mounting them makes ample provision for these slight differences in size and insures that all of the ribs will be held with equal rigidity in the desired operating position in the grate fall. This very desirable end is attained by the action of a clamp plate 23 which, as it is drawn home, will tend by its bevelled stop shoulder 28 to force all ribs it engages against the upper rail seat 14 and its compressible liner strip 29 will give and take care of any inequalities or unevenness in the length of the ribs, so that all will be firmly seated against the upper rib rail seat 14. In like manner, the lower rib ends 26 will all be clamped positively and accurately in centered relation between the elements 22 and 25 because notwithstanding any slight inequality in the thickness of the rib ends, the compressible liner strip 22 will yield and cause all to be firmly gripped by the lip on the clamp plate and all rigidly held fixedly in engagement with their upper and lower rib rail supports.

It is a simple matter for the holes 15 to be drilled with accurate alignment and centering in the upper rib rail and all be of uniform size. The flange 13 of the upper rib rail can be easily faced so as to produce a uniform flat seat with which the rib shoulders 19 will have flush engagement. It is also comparatively simple to turn a true stud 20 that will fit snugly in any one of the holes 15. All these provisions for the centering of ribs can be accomplished with great accuracy at low cost, and the ribs will be held positively against displacement at their upper ends opposite the saw teeth. The lower rib ends 26 can be very simply and economically ground or faced to true size so that they will abut as they rest on the lower rib rail, each having a width corresponding to the spacing between centers of the holes 15 in the upper rib rail. Thus, when the clamp plates are screwed home, the lower rib ends will provide ample upper and lower surfaces engaged between the clamping faces to hold the ribs against cocking sidewise, and to thrust and hold their shoulders 19 in firm engagement with the upper rib rail seat 14. As the pressure from the roll and thrust from the linting action of the saws come on the upper end of the rib rails they are brought under tension and their shoulders 19 will transmit these working stresses from the stud to the rib rail seat 14, thereby greatly strengthening the ribs against fracture.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. A gin rib mounting, comprising in combination an upper rib rail element faced to provide a flat end bearing seat against which the upper rib ends abut, said seat having aligning holes bored with parallel equi-distant axes, a lower rib rail element, ribs each having at one end a stud adapted to fit snugly into one of said holes and a shoulder substantially normal to the line of thrust on a rib and adapted to abut against said upper rib rail seat in front of said stud, and means to secure the lower ends of the ribs in centered relation on the lower rib rail element in conformity with the centering of their upper ends on the upper rib rail, but out of alignment with a plane intersecting the axes of said holes.

2. A gin rib mounting in accordance with claim 1, in which the shoulder at the upper end of each rib is set forwardly of, and normal with respect to, the stud on said rib and its plane of engagement with the upper rib rail seat is set to cause the working stresses which put the rib under tension to be imposed directly on the upper rib rail seat.

3. A gin rib mounting comprising an upper rib rail element having a smooth faced seat provided with intermediate centering holes drilled in alignment on predetermined centers, ribs having reduced ends shaped to provide centering studs adapted to slip with a snug fit into said holes, a lower rib rail element having a continuous plain rib seat, means coacting therewith in a plane offset from but substantially parallel with the plane of the centering hole axes to clamp the lower ends of the ribs in position with their studs engaged in said holes, said clamp means comprising a compressible element to make provision for inequalities in the size of the rib ends which they engage.

4. A gin rib mounting for linter gins, in combination, an upper rib rail element faced and bored to provide an aligning series of accurately centered holes in a flat rib seat, a lower rib rail element having a continuous plain surface to receive the lower ends of the ribs, ribs each having its upper end reduced to form a stud shaped to fit accurately in one of said holes and having forwardly of said stud a shoulder faced and disposed to abut squarely against the seat on said upper rib rail element, the ribs at their lower ends being enlarged and laterally faced off parallel to a width equal to the distance between centers of said holes, and demountable clamp means adapted to engage the abutting lower ends of the rib rails and demountably hold the ribs in fixed relative working position.

5. A gin rib mounting for linter gins, in combination, a bulb angle forming an upper rib rail element and having its lower flange faced to form a seat and bored to provide in said seat an aligning series of accurately centered holes, a lower rib rail element having a continuous flat surface disposed substantially normal to said bored seat and adapted to receive the lower ends of the ribs, ribs having upper end studs adapted to fit accurately and interchangeably in said holes and faced shoulders adapted to take a bearing on the faced angle flange above in front of the holes therein, said shoulders being so disposed that when the ribs are brought under tension by their working load they will transfer the resultant stress directly through said shoulders to said faced seat, the ribs at their lower ends being laterally enlarged and faced off to a width corresponding to the distance between centers of said holes, and demountable means adapted to engage the abutting lower ends of the ribs to demountably clamp them in position against both rib rails.

GEORGE C. MORGAN.